(12) United States Patent
McCabe (10) Patent No.: US 11,871,229 B2
(45) Date of Patent: Jan. 9, 2024

(54) WIRELESS NETWORK SECURITY SYSTEM AND METHOD

(71) Applicant: Liam McCabe, Meath (IE)

(72) Inventor: Liam McCabe, Meath (IE)

(*) Notice: Subject to any disclaimer, the term of this patent is extended or adjusted under 35 U.S.C. 154(b) by 105 days.

(21) Appl. No.: 17/180,042

(22) Filed: Feb. 19, 2021

(65) Prior Publication Data

US 2021/0266744 A1    Aug. 26, 2021

(30) Foreign Application Priority Data

Feb. 22, 2020  (GB) ..................................... 2002516

(51) Int. Cl.
| | |
|---|---|
| *H04W 12/08* | (2021.01) |
| *H04L 9/40* | (2022.01) |
| *H04W 12/06* | (2021.01) |
| *H04L 61/5014* | (2022.01) |
| *G16Y 30/10* | (2020.01) |
| *H04W 84/12* | (2009.01) |
| *H04L 101/622* | (2022.01) |

(52) U.S. Cl.
CPC ......... *H04W 12/08* (2013.01); *H04L 61/5014* (2022.05); *H04L 63/0861* (2013.01); *H04W 12/06* (2013.01); *G16Y 30/10* (2020.01); *H04L 2101/622* (2022.05); *H04W 84/12* (2013.01)

(58) Field of Classification Search
CPC ....... H04W 12/08; H04W 12/06; H04W 4/50; H04W 4/70; H04W 84/12; H04L 61/2015; H04L 61/5014; H04L 63/0861; H04L 9/0891; H04L 9/3231; H04L 9/3239; H04L 9/50; H04L 2101/622; H04L 2209/80; G16Y 30/10
See application file for complete search history.

(56) References Cited

U.S. PATENT DOCUMENTS

| | | | |
|---|---|---|---|
| 2011/0211219 | A1 | 9/2011 | Bradley et al. |
| 2020/0065410 | A1* | 2/2020 | Craig ...................... G06F 16/27 |
| 2020/0084097 | A1* | 3/2020 | Marks .............. G06Q 20/38215 |

(Continued)

OTHER PUBLICATIONS

Brincat, et al., "On the use of Blockchain technologies in WIFI networks", Computer Networks, vol. 162 (2019), 106855.

*Primary Examiner* — Farid Homayounmehr
*Assistant Examiner* — Brian William Avery
(74) *Attorney, Agent, or Firm* — Saul Ewing LLP (57) ABSTRACT

Traditional Media Access Channel (MAC) address filtering used to prevent a device from gaining access to a wireless network requires an operator to manually enter the MAC address of the undesirable device into the Dynamic Host Configuration Protocol (DHCP) server of the wireless network. However, the present invention does not require or permit manual entry of MAC addresses into the DHCP server. Instead, unique identifiers of devices seeking permission to join the wireless network are contained in a Candidate Joining Device (CJD) Record which resides on a distributed ledger technology infrastructure. The use of a distributed ledger infrastructure, prevents unauthorised users from modifying MAC address records in a DHCP server to grant an unauthorised device access to a wireless network, as any such modification to a CJD Record must be read from and accepted by the members of the distributed ledger infrastructure in accordance with the consensus mechanism thereof.

15 Claims, 2 Drawing Sheets

(56) References Cited

U.S. PATENT DOCUMENTS

| | | | | |
|---|---|---|---|---|
| 2020/0092704 A1* | 3/2020 | Singh | .................... | H04L 67/10 |
| 2020/0275271 A1* | 8/2020 | Saripalle | .............. | G06V 10/809 |
| 2021/0409405 A1* | 12/2021 | Salajegheh | ......... | H04L 63/0884 |

\* cited by examiner

WIRELESS NETWORK SECURITY SYSTEM AND METHOD

CROSS-REFERENCE TO RELATED APPLICATIONS

This application claims priority to UK Application No. GB 2002516.9, filed on Feb. 22, 2020, the entire contents of which being fully incorporated herein by reference.

FIELD OF THE INVENTION

The present invention relates to a wireless network security system and method; and more specifically a physically regulated system and method for controlling access of a wireless device to a wireless network.

BACKGROUND OF THE INVENTION

An ever-increasing consumer demand, improved technological advancements (e.g. software/hardware infrastructure) and industry collaboration has driven significant growth in modern telecommunications networks and continues to drive its evolution. More recently, a transition is underway from existing 4th Generation (4G) networks to new 5G networks offering the promise of greater data transfer speeds, reduced latency and increased connectivity enabling more people and devices to communicate at the same time.

The Internet of things (IoT) is a rapidly emerging paradigm in which a great variety of objects are instrumented so that they can be queried and/or operated over the Internet either directly by their users or by programs that encapsulate their behaviours and objectives. The practical realization of IoT requires the development of a number of new platforms and technologies including device and process identification and tracking, sensing and actuation, communication, computational sensing, etc. However, the most challenging of requirements will be security. With IoT, the potential for malicious attacks can and will be greatly spread and actuated from the Internet to the physical word. Hence, security of IoT is of essential importance.

Current mechanisms for regulating access to a wireless network are primarily digital and rely on passwords and usernames to be communicated between the network and a device seeking access to the network. The necessity of remembering password/username combinations is inconvenient for network owners and the necessity of typing such combinations is inconvenient for the owners of devices seeking to join the network. A further complication is that many IoT devices lack the necessary computational power of to process complex username/password combinations.

But perhaps even more importantly, the current digital password approach is intrinsically insecure, as once shared by the owner of the network with another person, the owner no longer has control over the password/username (beyond resetting them which is itself an inconvenient process). In particular, the person in receipt of the password/username receiving visitor may share it with other people without the knowledge or consent of the network owner. Similarly, insecure encryption technology and careless password naming strategies (e.g. using pet names or family names, simple numbers or common dictionary words etc.) also enable usernames and passwords to be acquired by unauthorised persons.

A smart home is vulnerable to security threats because it uses the Internet that utilizes Radio Frequency Identification (RFID), Wireless Sensor Network (WSN), Wi-Fi, 3G, and 4G. Thus, the information collected by the sensors installed in IoT devices can leak personal information to the attacker owing to their vulnerability. For example, a key stroke inference attack relies on the fact that most commercially available IoT devices comprise input devices such as touch screens, touch pads, and keyboards. When a user enters an ID, password, or word into a smart device, the device tilts and rotates to create a deviation of the data in the sensor (e.g., accelerometer, gyroscope, audio, light sensor, etc.) for each instance. An attacker can use this deviation of sensor data to infer a keystroke. Keystroke inference attacks can be made on IoT devices, but they can also affect nearby devices (for example, by putting the smartphone on a desk with a keyboard).

Similarly, IoT devices can also leak wi-fi passwords through insecure servers. Furthermore, data can also be intercepted while in transit to and from the device, for example, through the application controlling the device, or the server where the application is hosted.

SUMMARY OF THE INVENTION

According to a first aspect of the invention there is provided a wireless network security method comprising the steps of:

preconfiguring the values of a first time interval and a second time interval for receipt of a user input to an authorising device and a verifying device respectively;

detecting by a DHCP server forming part of the wireless network an identifier of a first Wi-Fi enabled device on its entering the range of the wireless network interrogating a record of Wi-Fi enabled devices that previously sought permission to join the wireless network to find an entry with a identifier that matches that of the first Wi-Fi enabled device;

checking the values of a first and second indicator in a matching entry in the event a matching entry is found in the record, granting by the DHCP server, permission to the first Wi-Fi enabled device to join the wireless network in the event the first and second indicator in the matching entry both have a first value, thereby indicating that a Wi-Fi enabled device corresponding to the matching entry had been previously granted permission to join the network and otherwise refusing the first Wi-Fi enabled device permission to join the wireless network;

adding a new entry to the record for the first Wi-Fi enabled device in the event a matching entry is not found in the record and thereby creating an amended record, wherein the new entry in the amended record comprises two indicators both of which are set to a second value;

sharing the amended record with an authorising device;

requesting a user input to the authorising device on its receipt of the amended record;

updating the first indicator in the matching entry to the first value in the event the user input is received by the authorising device within the first time interval to thereby create an updated amended record; sharing the updated amended record with the verifying device; and otherwise denying the first Wi-Fi enabled device permission to join the wireless network;

requesting a user input to the verifying device on its receipt of the updated amended record; and updating the second indicator in the matching entry to the first value in the event the user input is received by the verifying device within the second time interval to thereby create an further updated amended record; sharing the updated amended record with the DHCP server and replacing the record with the updated amended record; and otherwise denying the first Wi-Fi enabled device permission to join the wireless network.

Preferably, the steps of sharing the amended record with an authorising device; sharing the updated amended record with the verifying device; and sharing the updated amended record with the DHCP server are conducted through a distributed ledger infrastructure.

Preferably, the step of requesting a user input to the authorising device comprises the step of requesting the user to perform a physical act to be detected by the authorising device; and the step of requesting a user input to the verifying device comprises the step of requesting the user to perform a physical act to be detected by the verifying device.

Preferably, the step of requesting the user to perform a physical act to be detected by the authorising device comprises the step of requesting the user to perform the physical act selected from the group comprising:

clicking a switchable member on the authorising device;
touching a sensor on the authorising device,
providing a behavioural biometric comprising performing a motion or gesture proximal to the authorising device; and
providing a physical biometric to the authorising device.

Desirably, the method comprises the step of preconfiguring the authorising device with a reference example of a required motion or gesture;

the step of requesting the user to perform a motion or gesture proximal to the authorising device and the step of updating the first indicator in the matching entry to the first value in the event the user input is received by the authorising device, comprises the steps of establishing a similarity metric for comparing a detected motion or gesture with a reference example of the same and establishing a threshold for the similarity metric;

detecting a motion or gesture performed by the user;

calculating a similarity metric by comparing the detected motion or gesture with the reference example of the required motion or gesture; and updating the first indicator in the matching entry to the first value in the event the calculated similarity metric exceeds the threshold.

Desirably, the step of requesting the user to perform a physical act to be detected by the verifying device comprises the step of requesting the user to perform the physical act selected from the group comprising clicking a switchable member on the verifying device;
touching a sensor on the verifying device,
providing a behavioural biometric comprising performing a motion or gesture proximal to the verifying device; and
providing a physical biometric to the verifying device.

Preferably, the method comprises the step of preconfiguring the verifying device with a reference example of a required motion or gesture;

the step of requesting the user to perform a motion or gesture proximal to the verifying device and the step of updating the second indicator in the matching entry to the first value in the event the user input is received by the verifying device within the second time interval, comprises the steps of establishing a similarity metric for comparing a detected motion or gesture with a reference example of the same and establishing a threshold for the similarity metric;

detecting a motion or gesture performed by the user;

calculating a similarity metric by comparing the detected motion or gesture with the reference example of the required motion or gesture; and updating the second indicator in the matching entry to the first value in the event the calculated similarity metric exceeds the threshold.

Preferably, the step of requesting the user to perform a physical act to be detected by the verifying device comprises the step of requesting the user to perform a physical act that differs from that detected by the authorising device.

Desirably, the steps of sharing the amended record with an authorising device; sharing the updated amended record with the verifying device; and sharing the updated amended record with the DHCP server are conducted through a smart contract.

Desirably, the step of detecting by a DHCP server an identifier of a first Wi-Fi enabled device on its entering the range of the wireless network comprises the step of detecting a MAC address or other unique identifier of the first Wi-Fi enabled device.

According to a second aspect of the invention there is provided a wireless network security system comprising a DHCP server coupled with an authorising device and a verifying device through a distributed ledger infrastructure wherein the DHCP server forms part of a wireless network and is adapted to receive a preconfigured record of Wi-Fi enabled devices that previously sought permission to join the wireless network replace the record with an updated amended record on receipt from the verifying device detect an identifier of a first Wi-Fi enabled device on its entering the range of the wireless network;

interrogate a record of Wi-Fi enabled devices that previously sought permission to join the wireless network to find an entry with a identifier that matches that of the first Wi-Fi enabled device;

grant permission to the first Wi-Fi enabled device to join the wireless network in the event a first and second indicator in the matching entry both have a first value, and otherwise refuse the first Wi-Fi enabled device permission to join the wireless network;

add a new entry to the record for the first Wi-Fi enabled device in the event a matching entry is not found in the record, to create an amended record, wherein the new entry in the amended record comprises two indicators both of which are set to a second value;

share the amended record with the authorising device; and wherein the authorising device is adapted to request and receive a user input on receipt of the amended record;

update the first indicator in the matching entry to the first value in the event the user input is received within the first preconfigured time interval to thereby create an updated amended record; and share the updated amended record with the verifying device; and otherwise deny the first Wi-Fi enabled device permission to join the wireless network; and wherein the verifying device is adapted to request and receive a user input on receipt of the updated amended record;

update the second indicator in the matching entry to the first value in the event the user input is received by the verifying device within the second time interval to thereby create an further updated amended record; share the updated amended record with the DHCP server; and otherwise deny the first Wi-Fi enabled device permission to join the wireless network.

Preferably, the distributed ledger infrastructure supports smart contracts and the record, amended record and updated amended record takes the form of a smart contract.

Preferably, the authorising device and the verifying device each comprises at least one sensor selected from the set comprising push button, togglable switch, touch sensor, camera, proximity sensor and biometric reader.

Desirably, the authorising device is adapted to request and receive a user input selected from the group comprising a click or touch input; a behavioural biometric including the performance of a motion or gesture by the user; and a physical biometric.

Desirably, the verifying device is adapted to request and receive a user input selected from the group comprising a click or touch input; a behavioural biometric including the performance of a motion or gesture by the user; and a physical biometric.

Preferably, the verifying device is adapted to request and receive a user input which differs from that for which the authorising device is adapted.

Traditional Media Access Channel (MAC) address filtering used to prevent a device from gaining access to a wireless network requires an operator to manually enter the MAC address of the undesirable device into the Dynamic Host Configuration Protocol (DHCP) server of the wireless network. However, the present invention does not require or permit manual entry of MAC addresses into the DHCP server. Instead, the unique identifiers of devices seeking permission to join the wireless network are contained in a Candidate Joining Device (CJD) Record which resides on a distributed ledger technology infrastructure. The use of a distributed ledger infrastructure, prevents unauthorised users from modifying MAC address records in a DHCP server to grant an unauthorised device access to a wireless network, as any such modification to a CJD Record must be read from and accepted by the members of the distributed ledger infrastructure in accordance with the consensus mechanism thereof.

Similarly, the use of the distributed ledger infrastructure also increases the security of the present invention since, for example, the transaction can be written into a smart contract that only the contract owner can initiate the transaction. As a result, only selected devices can update the contract.

Furthermore, by requiring a physical action to be performed in connection with an authorising device and a verifying device to enable a Wi-Fi enabled device to join a wireless network, the present invention avoids the necessity for a username and a password; and for the username and a password to be communicated between the device and the wireless network. Thus, the present invention offers enhanced security over traditional methods of access control, since the risk of the username and/or password being leaked from the Wi-Fi enabled device.

Indeed, by requiring a physical act to be performed in connection with the authorising device and a verifying device, the present invention offers enhanced security over traditional digital (username/password) methods of access control, since it is considerably more difficult for an unauthorised person to be in sufficient proximity to the authorising device and a verifying device to perform the required physical acts as compared with issuing a username and/or password from afar without any physical interaction with the access control devices for the wireless network.

Indeed, the verifying device may be a different device to the authorising device. Thus, further enhancing the security of the invention since the authorising device and the verifying device may be in different physical locations in the relevant premises. Thus, the physical actions required to cause the authorising device and the verifying device to respectively update the values of required flags and thereby allow a Wi-Fi enabled device to join a wireless network are more demanding than issuing a username and password. In particular, a hacker would need to physically contact with the wireless network and interact inside the physical premises and physically interact with the authorising and verifying devices to enable an unauthorised device to gain access to the wireless network. Thus, the method of the present invention is considerably more secure than traditional network access control mechanisms; and less likely to be hacked by an unauthorised person.

By combining a distributed ledger technology infrastructure and the necessity for physical actions to be performed in connection with an authorising device and a verifying device, the present invention removes the responsibility for authentication from the Wi-Fi enabled device seeking to join the wireless network; and ensures that the wireless network retains full responsibility and control over the process of deciding what Wi-Fi enabled devices can join the wireless network. In the process, the present invention overcomes the security risks posed by the leakage of passwords and usernames from wireless devices to persons or devices outside the wireless network.

Accordingly, the present invention will thus alleviate the leakage of Wi-Fi passwords from IoT devices and/or as part of data in transit through the application controlling the device, or the server where the application is hosted. In particular, a password does not exist in the present invention as authentication is achieved through the invention's distributed ledger-based device validation and authorisation methodology. More specifically, the present invention essentially removes the ability for key stroke or key logger attacks as a wireless network implementing the invention will effectively become impenetrable.

DESCRIPTION AND DRAWINGS

An embodiment of the invention is herein described by way of example only with reference to the accompanying drawings in which.

DETAILED DESCRIPTION

While certain specific features are illustrated in the above figures, those skilled in the art will appreciate from the present disclosure that various other features have not been illustrated for the sake of brevity and so as not to obscure more pertinent aspects of the implementations disclosed herein.

Figure 1:
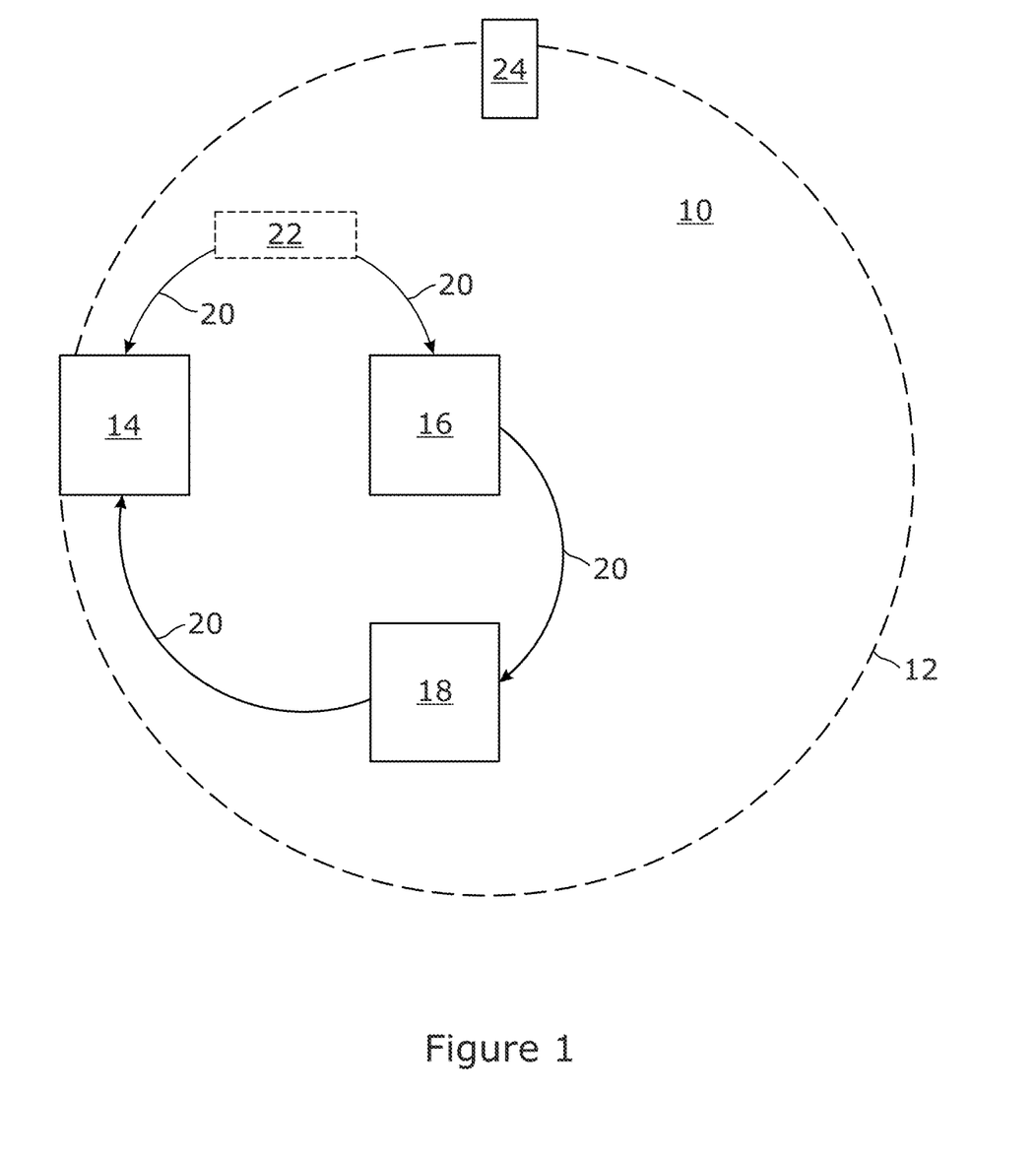
FIG. 1 is a block diagram of the wireless network security system according to the second aspect of the invention.

Referring to FIG. 1, the wireless network security system of the preferred embodiment comprises a wireless network 10 in which a router (not shown) or an access point (not shown) can support communications between wireless devices (not shown) located within an area whose limits are defined by an outer periphery 12 beyond which such communication is no longer supported. For brevity, this area will be referred to henceforth as the range of the wireless network 10.

Access to the wireless network 10 is controlled by a Dynamic Host Configuration Protocol (DHCP) server 14, an authorising device 16 and a verifying device 18. The DHCP server 14 forms part of the wireless network 10 and is used to manage Internet Protocol (IP) addressing and lease periods for access to the wireless network 10. The person skilled in the art will understand that the preferred embodiment is not limited to a specific DHCP configuration. For example, in a standard home wireless network, the router acts as the DHCP server and or vice versa. Thus, the skilled person will understand that the DHCP server can embrace any form of DHCP server router configuration.

The DHCP server 14, the authorising device 16 and the verifying device 18 may be configured to share, read and edit device-related records (known henceforth as Candidate Joiner Device Records (not shown)) through a public or private distributed ledger technology infrastructure (e.g. Ethereum, IOTA etc.) 20. The distributed ledger technology infrastructure may be operable through the wireless network 10 or another communications channel.

The authorising device 16 is adapted to use a wireless networking technology such as Wi-Fi. For brevity, a device which is adapted to use a wireless networking technology such as Wi-Fi will henceforth be referred to as a Wi-Fi enabled device. The authorising device 16 may have been previously authenticated to the wireless network 10 and may have been authorised by the DHCP server 14 to join the wireless network 10. The authorising device 16 is adapted to initiate the authentication of any new Wi-Fi enabled devices to the wireless network 10. The verifying device 18 is a second Wi-Fi enabled device which may have been previously authenticated to the wireless network 10 and authorised by the DHCP server 14 to join the wireless network 10. The verifying device 18 is adapted to verify the authorisation performed by the authorising device 16. Both or either of the authorising device 16 and the verifying device 18 may also take the form of distributed applications (DApps) installed on a network-validated Wi-Fi enabled device.

The distributed ledger technology infrastructure (e.g. Ethereum, IOTA etc.) 20 enables the DHCP server 14, the authorising device 16 and the verifying device 18 to share a Candidate Joining Device (CJD) Record 22. The CJD Record 22 lists all Wi-Fi enabled devices detected by the DHCP server 14 on entering the range of the wireless network 10. The CJD Record 22 may take the form of a smart contract 22 or other shared file structure. When in smart contract form, the CJD Record 22 may comprise an identifier of the contract owner (for example, an Ethereum account address), so that the DHCP server 14 need only read a specific contract pertaining to a specific wireless network. Network isolation and identification can take the form of a unique contract address for any network accessible only by a specific authorised account address (wherein the contract address and account address are hashed data strings that identify the user and the contract itself), or any other means of unique contract identification on any distributed ledger technology.

Figure 2:
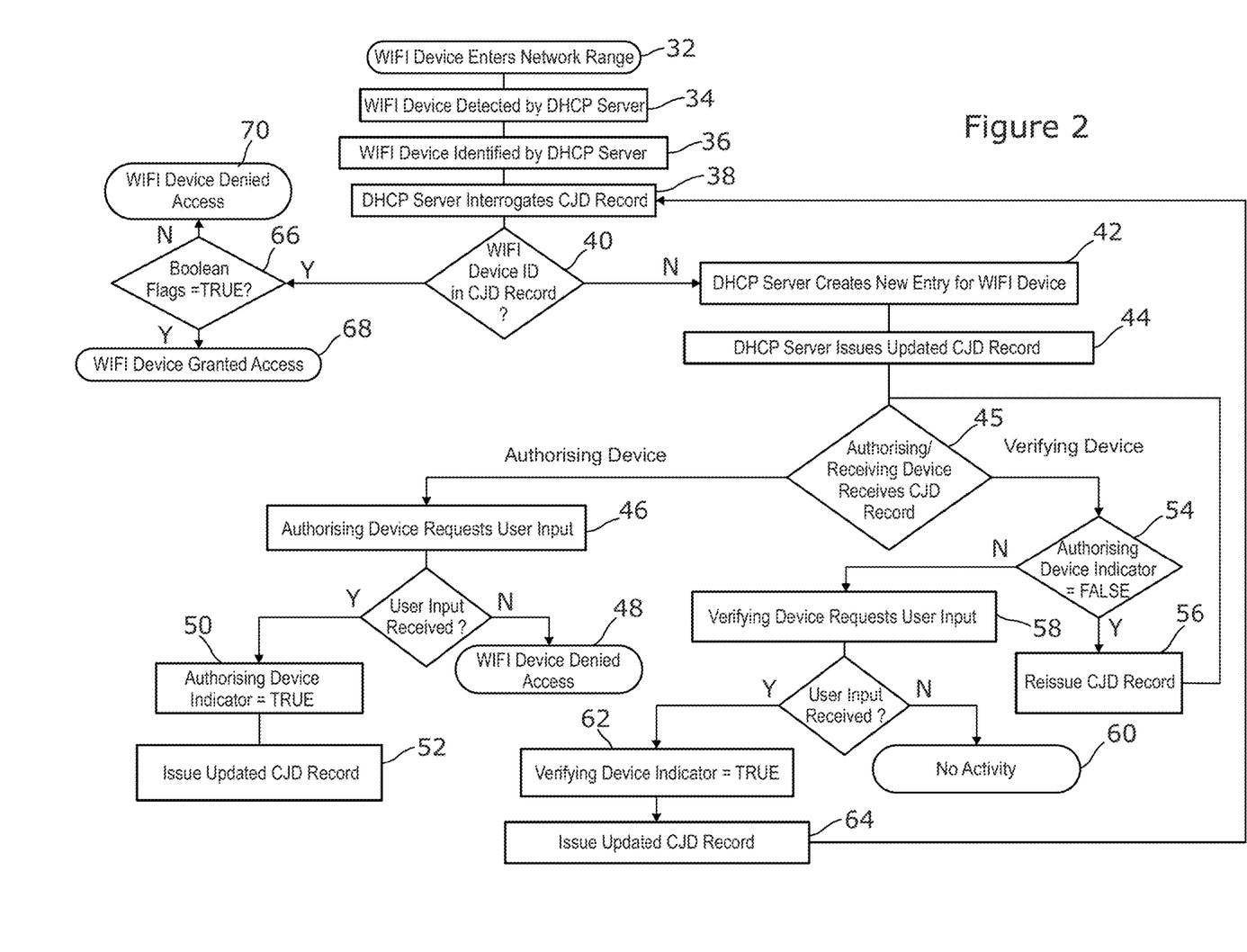
FIG. 2 is a flow chart of the wireless network security method according to the first aspect of the invention.

Referring to FIG. 1 together with FIG. 2, a Wi-Fi enabled device 24 that enters 32 the range of the wireless network 10 is detected 34 by the DHCP server 14. More specifically, the Wi-Fi enabled device 24 broadcasts (not shown) a DHCP discover message, which is a request for configuration information of the wireless network 10. On receipt of the DHCP discover message (not shown), the DHCP server 14 identifies 36 the Wi-Fi enabled device 24 by a unique identifier thereof (which may be contained in the DHCP discover request). The unique identifier may comprise a Media Access Control (MAC) address, a Universal Unique Identifier (UUID), or any alternative device identifier which can be applied to the Wi-Fi enabled device 24 by the manufacturer thereof (for example, the hardware-level MAC address in the underlying transport layer may be used if an identifier of the Wi-Fi enabled device 24 is not included in the DHCP discover message).

On receipt of the unique identifier of the Wi-Fi enabled device 24, the DHCP server 14 interrogates 38 the CJD Record 22. The CJD Record 22 comprises details of all WIFI enabled devices that have historically entered the range of the wireless network 10. Individual records in the CJD Record 22 comprise the unique identifiers of each such WIFI enabled device, wherein each such unique identifier is coupled with two Boolean variables, namely the Authorising Device Flag (not shown) and the Verifying Device Flag (not shown). The CJD Record 22 may be stored on the distributed ledger technology infrastructure 20 or stored on the DHCP server 14. However, the CJD Record 22 may only be stored in the DHCP server 14 if the CJD Record 22 has first been retrieved from the distributed ledger technology infrastructure 20. Thus, the CJD Record 22 may not be manually entered into storage onto the DHCP server 14. This limits the opportunities for unauthorised parties to alter the CJD Record 22 to include identifiers of unauthorised devices to allow these devices to gain access to the wireless network 10.

The DHCP server 14 determines 40 whether the unique ID of the Wi-Fi enabled device 24 appears in the CJD Record 22. If the unique ID is not included in the CJD Record 22, (i.e. the Wi-Fi enabled device 24 has not entered the range of the wireless network 10 before), the DHCP server 14 amends the CJD Record 22 by adding 42 thereto a new entry for the Wi-Fi enabled device 24. In this way, the CJD Record 22 grows as more devices seek permission to join the wireless network 10.

A new entry in the CJD Record 22 comprises the unique ID of the Wi-Fi enabled device 24 and the two Boolean variables (i.e. the Authorising Device Flag and the Verifying Device Flag which are each set to a default value of FALSE.

For example, a new entry in the CJD Record 22 could comprise the following:
["deviceIdentifier": "JO:IN:IN:GD:EV:IC:E1",
"authorisingDevice": true,
"verifyingDevice": true
}

The person skilled in the art will understand that the above representation of an entry in the CJD Record 22 is provided for example only and in no way limits the scope of the preferred embodiment. In particular, the skilled person will understand that the preferred embodiment is operable with any form of entry in the CJD Record 22 which includes any information suitable for implementing the identification, authorisation and verification of a Wi-Fi enabled device. Similarly, the skilled person will understand that the device identifier "JO:IN:IN:GD:EV:IC:E1" is provided herein for illustration purposes only. In particular, the skilled person will understand that the preferred embodiment is in no way limited to this device identifier or form of device identifier. On the contrary, the preferred embodiment is operable with any form or representation of device identifier capable of identifying a Wi-Fi enabled device. Individual entries in the CJD Record 22 may be in plain text form or in encrypted form as required by the network operator or the DHCP server manufacturer.

For brevity, the new entry into the CJD Record 22 for the Wi-Fi enabled device 24 will be referred to henceforth as the "New Entry; and the CJD Record 22 resulting from the addition thereto of the New Entry will be referred to henceforth as the "Amended CJD Record"

The DHCP server 14 then issues 44 (using either a wireless or wired communication protocol) the Amended CJD Record 22 through the distributed ledger technology infrastructure 20 so that the Amended CJD Record 22 may be received 45 and read by the Authorising Device 16 and the Verifying Device 18. On receipt of the Amended CJD Record 22 by the Authorising Device 16, it may request 46 the owner of the wireless network 10 for an input. The input may take the form of one of the following:

- click or touch input from the owner
- a behavioural biometric including the performance of a motion or gesture by the owner
- any other mechanism which can receive an input from the owner.

For example, the Authorising Device 16 may comprise a push button or a switch that must be pressed or toggled by the wireless network owner to enable authorisation of a Wi-Fi enabled device.

If the required input is a motion or gesture from the owner, the motion or gesture is detected by a sensor system (not shown) and compared (not shown) with a known reference example of the same motion or gesture which may have been stored in the Authorising Device 16 by the owner of the wireless network 10 on initially setting up the wireless network 10. The purpose of the comparison is to determine if the detected motion or gesture substantially matches the known reference example of the same. The comparison comprises

- establishing a similarity metric for assessing the degree of similarity of the detected motion or gesture with the known reference example;
- establishing a threshold for the similarity metric
- calculating the value of the similarity metric for the detected motion or gesture and establishing that the detected motion or gesture is a match with the known reference example in the event the calculated similarity metric exceeds the threshold; and
- establishing that the required user input has been received in the event a match is found between the detected motion or gesture and the reference example.

In another example, the user input could include the provision of a physical biometric by the owner (e.g. a fingerprint) and the provided physical biometric is compared against preconfigured known example of the physical biometric to determine if the provided physical biometric substantially matches the known example of the same. The comparison is performed in an analogous manner to that performed for the behavioural biometric.

If the answer is in the affirmative then the required input is deemed to have been received by the Authorising Device 16, otherwise the required user input is deemed not to have been received by the Authorising Device 16.

If the required user input is not received by the Authorising Device 16 within a predefined time interval, the Wi-Fi enabled device is denied 48 permission to join the wireless network 10. Otherwise, the Authorising Device 16 updates 50 the value of the Authorising Device Flag in the New Entry to TRUE. The updated Amended CJD Record is then reissued 52 through the distributed ledger technology infrastructure 20.

If the Amended CJD Record 22 is received by the Verifying Device 18, the Verifying Device 18 first checks 54 the New Entry to determine if the Authorising Device Flag therein is set to a value of FALSE. If the Authorising Device Flag is set to a value of FALSE, it suggests that the Authorising Device 16 has not yet received the Amended CJD Record 22 and the Verifying Device 18 takes 56 no further action. If the Authorising Device Flag is set to a value of TRUE, the Verifying Device 18 may request 58 the owner of the wireless network 10, or an already authenticated device for an input. The input may take the form of one of the following:

- click or touch input from the owner
- a behavioural biometric including the performance of a motion or gesture by the owner
- any other mechanism which can receive an input from the owner For example, the Verifying Device 18 may comprise a push button or a switch that must be pressed or toggled by the wireless network owner to enable authorisation of a Wi-Fi enabled device.

If the required input is a motion or gesture from the owner, the motion or gesture is detected by a sensor system (not shown) and compared (not shown) with a known reference example of the same motion or gesture which may have been stored in the Verifying Device 18 by the owner of the wireless network 10 on initially setting up the wireless network 10. The purpose of the comparison is to determine if the detected motion or gesture substantially matches the known reference example of the same. The comparison comprises:

- establishing a similarity metric for assessing the degree of similarity of the detected motion or gesture with the known reference example;
- establishing a threshold for the similarity metric
- calculating the value of the similarity metric for the detected motion or gesture and establishing that the detected motion or gesture is a match with the known reference example in the event the calculated similarity metric exceeds the threshold; and
- establishing that the required user input has been received in the event a match is found between the detected motion or gesture and the reference example.

In another example, the user input could include the provision of a physical biometric by the owner (e.g. a fingerprint) and the provided physical biometric is compared against preconfigured known example of the physical biometric to determine if the provided physical biometric substantially matches the known example of the same. The comparison is performed in an analogous manner to that performed for the behavioural biometric.

If the answer is in the affirmative then the required input is deemed to have been received by the Verifying Device 18, otherwise the required user input is deemed not to have been received by the Verifying Device 18.

The physical act required by the Authorising Device 16 may be the same or different from that required by the Verifying Device 18. Ideally, the required input to the Authorising Device 16 should differ from the required input to the Verifying Device 18. For example, the Authorising Device 16 could be manufactured to have a button on top that the network owner must press to enable a wireless to be authorised to join the wireless network. Similarly, the Verifying Device 18 could have an icon on a touch screen that must be pressed by the network owner to enable the authorisation of the wireless device to be verified. This means that two different physical actions must be performed by the network owner to allow the wireless device to be allowed to join the wireless network. Nevertheless, in practice, the required input to both the Authorising Device 16 and the Verifying Device 18 may be determined by the manufacturers thereof.

If the required user input is not received by the Verifying Device 18 within a predefined time interval, the Wi-Fi enabled device is denied 60 permission to join the wireless network 10. Otherwise, the Verifying Device 18 updates 62 the value of the Verifying Device Flag in the New Entry to TRUE. The updated Amended CJD Record is then reissued 64 through the distributed ledger technology infrastructure 20 to the DHCP server 14.

Referring to the step in which the DHCP server 14 determines 40 whether the Wi-Fi enabled device 24 unique ID appears in the CJD Record 22, if the answer is in the affirmative, it means that the Wi-Fi enabled device 24 had previously entered the range of the wireless network 10. For brevity, an entry in the CJD Record 22 containing the unique ID of the Wi-Fi enabled device 24 will be referred to henceforth as the Wi-Fi enabled device's entry.

On detecting the presence of the Wi-Fi enabled device's 24 unique ID in the CJD Record 22, the DHCP server 14 checks 66 the values of the Boolean variables (i.e. the Authorising Device Flag and the Verifying Device Flag) in the Wi-Fi enabled device's entry. If both Boolean variables have a value of TRUE, the Wi-Fi enabled device 24 has been previously registered as an authorised WI-FI enabled device for the wireless network 10; and the Wi-Fi enabled device 24 is granted 68 permission to join the wireless network 10. Permission to join the wireless network 10 may take the form of:
- assigning a valid Internet Protocol (IP) address to the Wi-Fi enabled device 24;
- assigning a valid lease period to the Wi-Fi enabled device 24;
- any other access control mechanism which can be installed on a modem by the modem manufacturer.

On being granted permission to join the wireless network 10, the Wi-Fi enabled device 24 may be granted full read/write access to the files or folders on the wireless network 10 according to the access protocols of the wireless network 10 operator. But the Wi-Fi enabled device 24 may not be granted access to the CJD Record 22 or other files or folders in the DHCP server 14. However, if either or both of the Boolean variables in the Wi-Fi enabled device's entry have a value of FALSE, the Wi-Fi enabled device 24 is denied 70 access to the wireless network 10.

In a further embodiment, the above-mentioned device authorisation and validation steps can be written into a smart contract so that only the contract owner can initiate the transaction. As a result, only selected devices can update the contract. In other words, for example, an onlyOwner function modifier could be applied to a smart contract based on a specific IoT device validated on the wireless network 10. This would mean that a verification process can only be initiated by that device and no external device could initiate the authentication process. In FIG. 2, the Authorising Device 16 can be the only one device on the wireless network 10 that initiates updating of CJD device record. This cannot be done from any other device on the wireless network 10 and only works from the contract owner device.

y way of example, a first person visits a second person in their home. The first person brings their mobile phone with them and desires to avail of the facilities of a wireless network in the second person's home. Rather than giving the first person a password to gain access to the wireless network, the second person performs:
- a first physical act in connection with the authorising device to authorise the first person's mobile phone; and
- a second physical act in connection with the verifying device to verify the authorisation of the first person's mobile phone.

It is only if both the first and second physical acts are performed within a preconfigured time interval, that the first person's mobile phone is granted permission to join the wireless network in the second person's home.

The first and second physical acts may include a button press, a mouse click, a touch screen input, a biometric recognition or any possible input that is able to be accepted by the authorising device and the verifying device respectively. However, neither the form of the first and second physical acts or the execution thereof is a configurable option of the authorising device or the verifying device. Instead, both the required form of the first and second physical acts and the required execution of both is preconfigured as a mandatory requirement for a Wi-Fi enabled device to be allowed to join a wireless network.

Modifications and alterations may be made to the above invention without departing from the scope of the invention.

The invention claimed is:

1. A physically activated device authorisation method to control device access to a wireless network, wherein the method comprises the steps of:
  preconfiguring the values of a first time interval and a second time interval for receipt of a user input to an authorising device and a verifying device respectively;
  detecting by a DHCP server forming part of the wireless network an identifier of a first Wi-Fi enabled device on its entering the range of the wireless network;
  interrogating, a record of Wi-Fi enabled devices that previously sought permission to join the wireless network to find an entry with an identifier that matches that of the first Wi-Fi enabled device;
  checking the values of a first and second indicator in a matching entry in the event a matching entry is found in the record;
  granting by the DHCP server, permission to the first Wi-Fi enabled device to join the wireless network in the event the first and second indicator in the matching entry both have a first value, thereby indicating that a Wi-Fi enabled device corresponding to the matching entry had been previously granted permission to join the wireless network and otherwise refusing the first Wi-Fi enabled device permission to join the wireless network;
  adding a new entry for the first Wi-Fi enabled device to the record in the event a matching entry is not found therein and thereby creating an amended record, wherein the new entry in the amended record comprises the first and second indicators both of which are set to a second value;
  sharing the amended record with an authorising device;
  requesting a first user for an input to the authorising device on its receipt of the amended record;
  updating the first indicator in the new entry to the first value in the event the first user's input is received by the authorising device within the first time interval to thereby create an updated amended record; sharing the updated amended record with the verifying device; and otherwise denying the first Wi-Fi enabled device permission to join the wireless network;
  requesting a second user for an input to the verifying device on its receipt of the updated amended record; and
  updating the second indicator in the new entry to the first value in the event the second user's input is received by the verifying device within the second time interval to thereby create a further updated amended record; sharing the further updated amended record with the DHCP server and replacing the record with the further updated amended record; and otherwise denying the first Wi-Fi enabled device permission to join the wireless network.

2. The method according to claim 1 wherein the steps of sharing the amended record with an authorising device; sharing the updated amended record with the verifying device; and sharing the further updated amended record with the DHCP server are conducted through a distributed ledger infrastructure.

3. The method according to claim 1, wherein the step of requesting a first user for an input to the authorising device comprises the step of requesting the first user to perform a physical act to be detected by the authorising device; and the step of requesting a second user for an input to the verifying device comprises the step of requesting the second user to perform a physical act to be detected by the verifying device.

4. The method according to claim 3 wherein
the step of requesting the first user to perform a physical act to be detected by the authorising device comprises the step of requesting the first user to perform the physical act selected from the group comprising:
clicking a switchable member on the authorising device;
touching a sensor on the authorising device;
providing a behavioural biometric comprising performing a motion or gesture proximal to the authorising device; and
providing a physical biometric to the authorising device.

5. The method according to claim 4 wherein
the method comprises the step of preconfiguring the authorising device with a reference example of a required motion or gesture;
the step of requesting the first user to perform a motion or gesture proximal to the authorising device and the step of updating the first indicator in the new entry to the first value in the event the first user's input is received by the authorising device, comprises the steps of:
establishing a similarity metric for comparing a detected motion or gesture with a reference example of the same and establishing a threshold for the similarity metric;
detecting a motion or gesture performed by the first user;
calculating a similarity metric by comparing the detected motion or gesture with the reference example of the required motion or gesture; and
updating the first indicator in the new entry to the first value in the event the calculated similarity metric exceeds the threshold.

6. The method according to claim 3 wherein the step of requesting the second user to perform a physical act to be detected by the verifying device comprises the step of requesting the second user to perform the physical act selected from the group comprising
clicking a switchable member on the verifying device;
touching a sensor on the verifying device;
providing a behavioural biometric comprising performing a motion or gesture proximal to the verifying device; and
providing a physical biometric to the verifying device.

7. The method according to claim 6 wherein
the method comprises the step of preconfiguring the verifying device with a reference example of a required motion or gesture;
the step of requesting the second user to perform a motion or gesture proximal to the verifying device and the step of updating the second indicator in the new entry to the first value in the event the second user's input is received by the verifying device within the second time interval, comprises the steps of:
establishing a similarity metric for comparing a detected motion or gesture with a reference example of the same and establishing a threshold for the similarity metric;
detecting a motion or gesture performed by the second user;
calculating a similarity metric by comparing the detected motion or gesture with the reference example of the required motion or gesture; and
updating the second indicator in the new entry to the first value in the event the calculated similarity metric exceeds the threshold.

8. The method according to claim 3, wherein the step of requesting the second user to perform a physical act to be detected by the verifying device comprises the step of requesting the second user to perform a physical act that differs from that detected by the authorising device.

9. The method of claim 1 wherein the steps of sharing the amended record with an authorising device; sharing the updated amended record with the verifying device; and sharing the further updated amended record with the DHCP server are conducted through a distributed ledger smart contract.

10. A physically activated device authorisation method to control device access to a wireless network, wherein the system comprises a DHCP server coupled with an authorising device and a verifying device through a distributed ledger infrastructure;
wherein the DHCP server forms part of a wireless network and is adapted to:
receive a preconfigured record of Wi-Fi enabled devices that previously sought permission to join the wireless network;
replace the record with a further updated amended record on its receipt from the verifying device;
detect an identifier of a first Wi-Fi enabled device on its entering the range of the wireless network;
interrogate the record to find an entry with an identifier that matches that of the first Wi-Fi enabled device;
grant permission to the first Wi-Fi enabled device to join the wireless network in the event a first and second indicator in the matching entry both have a first value, and otherwise refuse the first Wi-Fi enabled device permission to join the wireless network;
add a new entry for the first Wi-Fi enabled device to the record in the event a matching entry is not found therein, to create an amended record, wherein the new entry in the amended record comprises the first and second indicators both of which are set to a second value;
share the amended record with the authorising device; and
wherein the authorising device is adapted to:
request and receive an input from a first user on receipt of the amended record; and
update the first indicator in the new entry to the first value in the event the first user's input is received within a first preconfigured time interval, to thereby create an updated amended record; and share the updated amended record with the verifying device; and otherwise deny the first Wi-Fi enabled device permission to join the wireless network;
wherein the verifying device is adapted to:
request and receive an input from a second user on receipt of the updated amended record;
update the second indicator in the new entry to the first value in the event the second user's input is received by the verifying device within the second time interval, to thereby create a further updated amended record; share the further updated amended record with the DHCP server; and otherwise deny the first Wi-Fi enabled device permission to join the wireless network.

11. The wireless network security system according to claim 10 wherein the distributed ledger infrastructure supports smart contracts and the record, amended record, updated amended record and further updated amended record takes the form of a smart contract.

12. The wireless network security system according to claim 10 wherein the authorising device and the verifying device each comprises at least one sensor selected from the set comprising push button, toggleable switch, touch sensor, camera, proximity sensor and biometric reader.

13. The wireless network security system according to claim 12 wherein the authorising device is adapted to request and receive an input selected from the group comprising a click or touch input; a behavioural biometric including the performance of a motion or gesture by the user; and a physical biometric.

14. The wireless network security system according to claim 12 wherein the verifying device is adapted to request and receive an input selected from the group comprising a click or touch input; a behavioural biometric including the performance of a motion or gesture by the user; and a physical biometric.

15. The wireless network security system according to claim 12 wherein the verifying device is adapted to request and receive an input which differs from the input the authorising device is adapted to request and receive.

\* \* \* \* \*